United States Patent

Wataya

[11] Patent Number: 5,257,501
[45] Date of Patent: Nov. 2, 1993

[54] CONTROL DEVICE FOR A CATALYST HAVING AN ELECTRIC HEATER

[75] Inventor: Seiji Wataya, Himeji, Japan

[73] Assignee: Mitsubishi Denki Kabushiki Kaisha, Tokyo, Japan

[21] Appl. No.: 937,287

[22] Filed: Aug. 31, 1992

[30] Foreign Application Priority Data

Oct. 1, 1991 [JP] Japan ............ 3-253496
Oct. 1, 1991 [JP] Japan ............ 3-253748

[51] Int. Cl.$^5$ ............ F01N 3/28
[52] U.S. Cl. ............ 60/284; 60/300; 123/179.21; 219/205
[58] Field of Search ............ 60/284, 300, 274; 422/174; 123/179.21, 198 D; 219/202, 205

[56] References Cited

U.S. PATENT DOCUMENTS

| | | | |
|---|---|---|---|
| 4,102,127 | 7/1978 | Saiki | 60/284 |
| 5,094,198 | 3/1992 | Trotta | 123/179.21 |
| 5,109,151 | 4/1992 | Demizu | 219/205 |
| 5,138,987 | 8/1992 | Schmid | 123/179.21 |
| 5,146,743 | 9/1992 | Maus | 60/284 |
| 5,163,290 | 11/1992 | Kinnear | 60/284 |

Primary Examiner—Douglas Hart
Attorney, Agent, or Firm—Sughrue, Mion, Zinn, Macpeak and Seas

[57] ABSTRACT

A control device for a catalyst having an electric heater: provided at an exhaust pipe of an engine, having a catalyst for purifying exhaust gas and an electric heater for heating the catalyst before and after starting the engine comprises a battery charged by a generator driven by the engine for supplying power to the electric heater and for driving a starter; a current sensor for detecting charged and discharged current of the battery; summing means for summing a value of the charged and discharged current since a current to the electric heater has started flowing until the engine starts operating and until the engine stops operating; and means for comparing the summed value with a predetermined value and for prohibiting the current flowing to the electric heater during a period at least before the engine starts operating when the summed value is equal to or less than the predetermined value.

3 Claims, 12 Drawing Sheets

CONTROL DEVICE FOR A CATALYST HAVING AN ELECTRIC HEATER

BACKGROUND OF THE INVENTION

FIELD OF THE INVENTION

The present invention relates to a control device for a catalyst having an electric heater for purifying exhaust gas of an engine for a vehicle.

DISCUSSION OF BACKGROUND

The exhaust gas control of an automobile has become severer year after year in view of the global environment protection. In recent times, it is strongly requested to reduce a level of hydrocarbons (HC) emitted during several minutes of a warming-up period after an engine is started. To meet the social request, a method is proposed wherein a catalyst is heated by an electric heater incorporated in the catalyst during a predetermined period before and after the starting of the engine, thereby reducing a time for the catalyst to be activated.

FIG. 2 shows construction of a control device for a catalyst having an electric heater incorporating a conventional engine control unit. A reference numeral 1 designates an engine, 2, a pressure sensor for detecting a load of the engine 1, 3, a revolution number sensor for detecting a revolution number of the engine 1, 4, an intake pipe, 5, an injector for supplying fuel to the engine 1, 6, an engine control unit, 7, an exhaust pipe, 8, a catalyst unit for purifying exhaust gas which is provided at the exhaust pipe 7, 9, an electric heater incorporated in the catalyst unit 8, 10, a generator which is driven by the engine 1, 11, a battery, 12, a control switch for turning ON and OFF the electric heater 9, 13, a key switch, 14, a catalyst control unit for controlling opening and closing of the control switch 12, and 15, a starter for starting the engine 1.

In the above construction, the engine control unit 6, receiving information of a load of an engine obtained based on the pressure sensor 2 and information of a revolution number of an engine obtained based on the revolution number sensor 3, calculates a fuel quantity to be supplied to the engine 1, that is, a driving pulse width of the injector 5, and controls the engine 1 so that the air-fuel ratio of the engine 1 becomes a predetermined one. After combustion in the engine 1, poisonous gases (HC, CO, NOx) are purified by passing them through the catalyst unit 8. To promote a purification efficiency of the catalyst unit 8 up to about 80%, it is necessary that a temperature of the catalyst reaches 400 to 500° C. or more. The battery 11 is charged by the generator 10 driven by the engine 1. The starter 15 is driven by the battery 11 through the key switch 13.

However, since the temperature of the catalyst is not sufficiently elevated several minutes after starting the engine 1, the purification efficiency is low and the poisonous exhaust gas components (especially HC) are much emitted. As a means of solving the problem, a method is proposed wherein preheating and heating after starting are performed by an electric heater incorporated in the catalyst unit 8.

FIG. 3 is a flow chart showing operation of the catalyst control unit 14. In step 101, the operation determines whether the key switch 13 is normally turned on to IG position (refer to FIG. 2). When the key switch 13 is turned on, in step 102, the operation turns on the control switch 12 and flows current from the battery 11 to the electric heater 9 during a predetermined period (about 20 seconds for preheating, about 20 seconds for heating after starting). By flowing current to the electric heater 9, the catalyst temperature is elevated as shown in curve "b" in FIG. 4. Curve "a" in FIG. 4 shows elevation of the catalyst temperature when the electric heater 9 is not used. When the preheating and the heating after starting are performed by the electric heater 9, the elevation of the catalyst temperature is accelerated as shown in curve "b", and the catalyst temperature reaches an activation temperature in a short time.

However, a power required for heating the electric heater 9 is 3 to 5 kW. Therefore, a discharge current of the battery 11 of 12V is 250 to 400 A. Although the discharging is performed in a short time, the discharged quantity of the battery 11 is not negligible.

As stated above, in the conventional control device for a catalyst having an electric heater, since the power applied to the electric heater is very large, a residual capacity of the battery 11 is considerably lowered as shown in FIG. 5. Accordingly, when the engine 1 is stopped after the engine 1 has been started and before the charging of the battery 11 by the generator 10 is sufficiently performed, and thereafter the operation for starting is performed again, the residual capacity of the battery 11 is further lowered by the power consumption for the preheating. Accordingly, the starter 15 can not be driven by the battery 11 by a sufficient revolution number and the engine 1 falls into incapacitance in starting.

Furthermore, since the power supply to the electric heater 9 in the conventional device is very large, when current flows from the battery 11 to the electric heater before starting (cranking), the residual capacity of the battery 11 is lowered, and as shown in curve "d" in FIG. 13, the voltage applied to the starter 15 in cranking is considerably lowered. (Curve "c" shows a normal battery voltage.) As a result, the revolution number of the engine in starting is lowered from curve "e" to curve "f" in FIG. 14, thereby deteriorating the starting performance. Especially, when a temperature of the engine is as low as −10° C. or less, since the viscosity of an engine oil is large, a load torque of the starter 15 is increased. With this increase, a starting current "g" in FIG. 14 is also increased, the voltage of the battery 11 is considerably lowered, and the revolution number for cranking the engine 1 is also considerably lowered thereby falling into incapacitance in starting.

SUMMARY OF THE INVENTION

It is an object of the present invention to provide a control device for a catalyst having an electric heater capable of preventing lowering of a capacity of a battery by flowing current from a battery to an electric heater of a catalyst and smoothly performing starting of an engine.

According to a first aspect of the present invention, there is provided a control device for a catalyst having an electric heater:

provided at an exhaust pipe of an engine, having a catalyst for purifying exhaust gas and an electric heater for heating the catalyst before and after starting the engine comprising:

a battery charged by a generator driven by the engine for supplying power to the electric heater and for driving a starter;

a current sensor for detecting charged and discharged current of the battery;

summing means for summing a value of the charged and discharged current since a current to the electric heater has started flowing until the engine starts operating and until the engine stops operating; and means for comparing the summed value with a predetermined value and for prohibiting the current flowing to the electric heater during a period at least before the engine starts operating when the summed value is equal to or less than the predetermined value.

According to a second aspect of the present invention, there is provided a control device for a catalyst having an electric heater:

provided at an exhaust pipe of an engine, having a catalyst for purifying exhaust gas and an electric heater for heating the catalyst before and after starting the engine comprising:

a battery charged by a generator driven by the engine for supplying power to the electric heater and for driving a starter;

means for calculating a discharged quantity of the battery by multiplying a first value of a predetermined current flowing to the electric heater by a time of flowing current to the electric heater;

engine revolution number detecting means for detecting a revolution number of the engine;

means for calculating a generated current of a generator based on the revolution number of the engine;

means for calculating a charged quantity of the battery by summing a second value of the generated current; and means for prohibiting the current flowing to the electric heater during a period at least before the engine starts operating when a third value of the charged quantity subtracted by the discharged quantity is below a predetermined value.

According to a third aspect of the present invention, there is provided a control device for a catalyst having an electric heater provided at an exhaust pipe of an engine, having a catalyst for purifying exhaust gas and an electric heater for heating the catalyst before and after starting the engine comprising:

a battery charged by a generator driven by the engine for supplying power to the electric heater and for driving a starter;

a temperature sensor for detecting a temperature of the engine; and means for comparing the temperature of the engine with a predetermined value and prohibiting a current flowing to the electric heater before the engine starts operating when the temperature of the engine is equal to or less than the predetermined value.

In the first aspect of the present invention, the charged and discharged current is detected by the current sensor. The value of the charged and discharged current is summed up thereby calculating the charged quantity of the battery. When the charged quantity is equal to or less than the predetermined value, the current flowing to the electric heater is prohibited at least before the engine starts operating.

In the second aspect of the present invention, the discharged quantity of the battery is calculated by multiplying the predetermined value of the current flowing to the electric heater by the time of flowing current to the electric heater. The charged quantity is calculated by summing up the generated current of the generator which is calculated by the revolution number of the engine. When the value of the charged quantity subtracted by the discharged quantity is the predetermined value or less, the current flowing to the electric heater is prohibited at least before the engine starts operating.

In the third aspect of the present invention, the temperature of the engine is detected by the temperature sensor. When the temperature of the engine is the predetermined value or less, the current flowing to the electric heater before the engine starts operating, is prohibited.

DETAILED DESCRIPTION OF THE PREFERRED EMBODIMENTS

Figure 1:
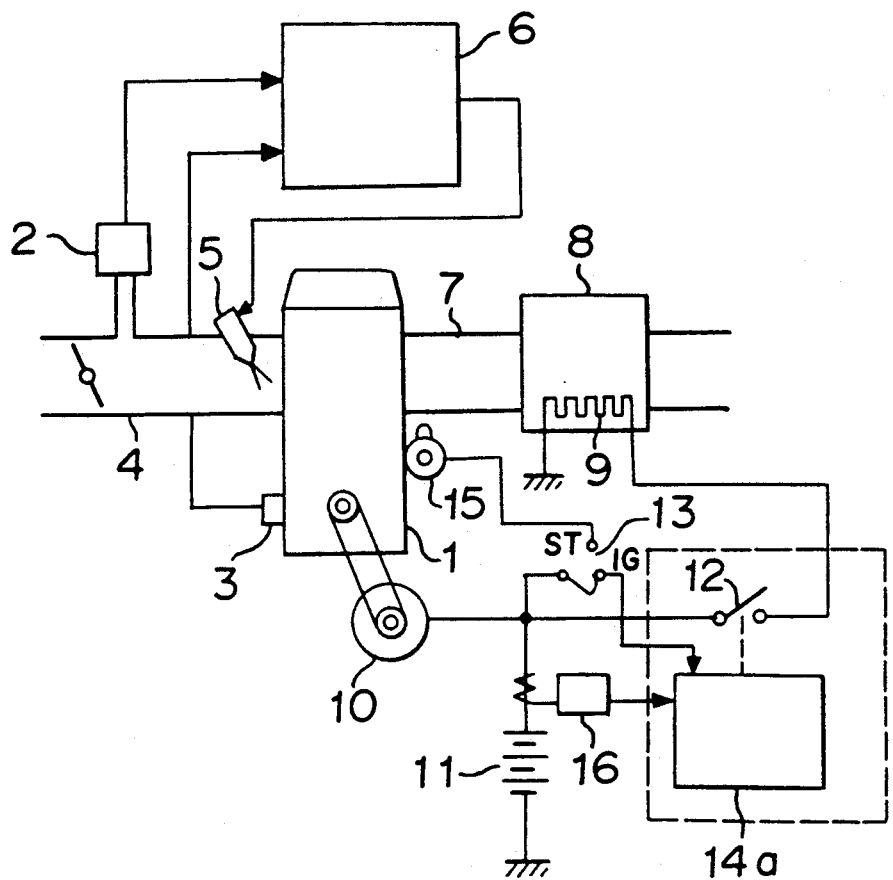
FIG. 1 is a construction diagram of an embodiment 1 of the invented device.

Explanation will be given to a first embodiment of this invention referring to the drawings as follows. FIG. 1 shows construction of a control device for a catalyst having an electric heater incorporating an embodiment of an engine control unit. A notation 14a designates a catalyst control unit, and 16, a current sensor for detecting a charged and discharged current of the battery 11. The other construction is the same as in FIG. 2.

Figure 6:
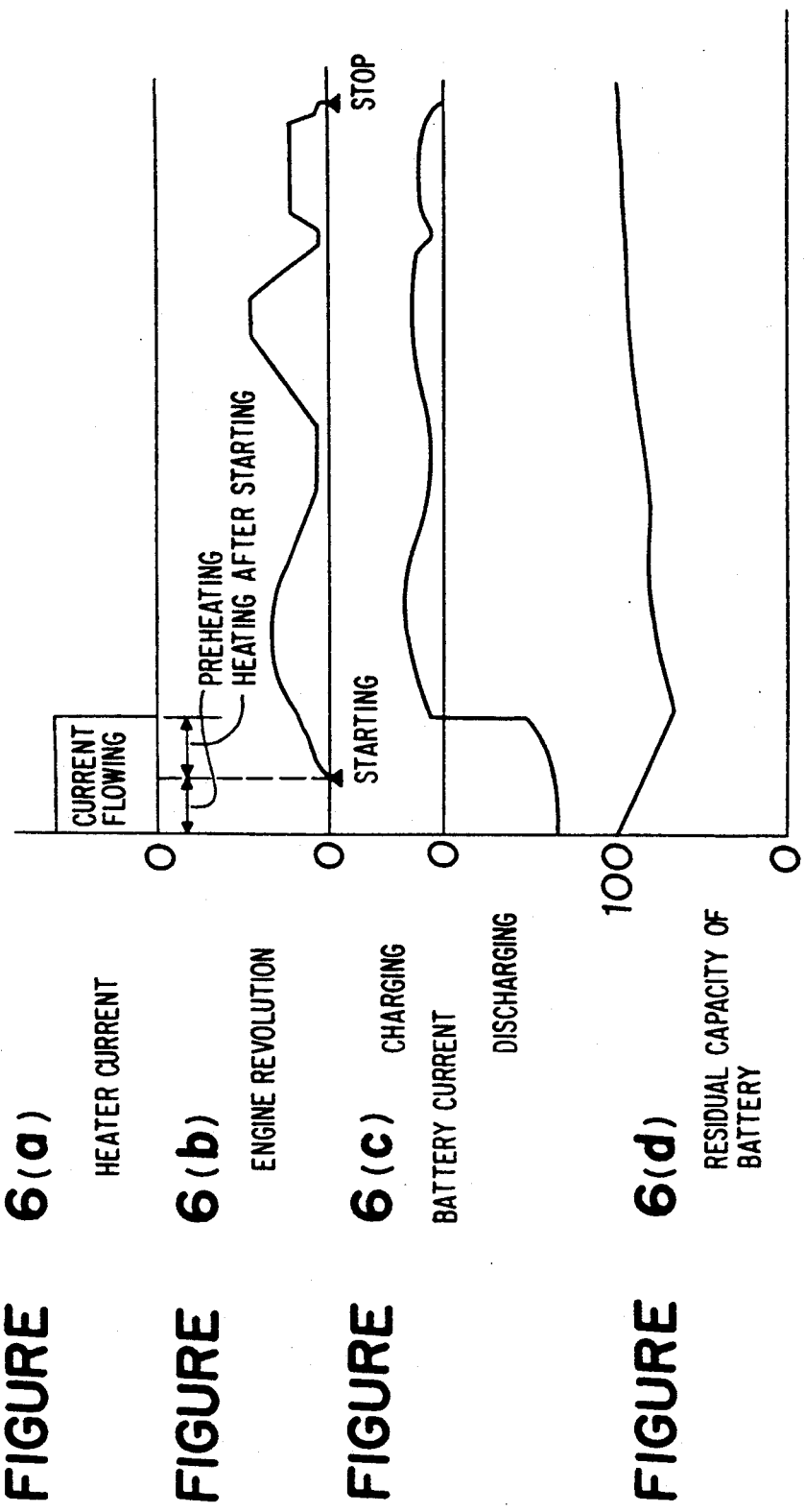
FIGS. 6(a) through 6(d) are time charts showing operation of the embodiment 1 of the invented device.

Next, the operation of the above construction will be explained based on time charts of FIGS. 6(a) through 6(d). First, when preheating and heating after starting are performed by flowing current to the electric heater 9 incorporated in the catalyst unit 8 as shown in FIG. 6(a), the battery 11 discharges by a large current as shown in FIG. 6(c), and as a result, the residual capacity of the battery 11 is considerably reduced as shown in FIG. 6(d). Even after the engine 1 is started, current flows from the battery 11 to the electric heater 9 for the heating after starting. Although the generator 10 driven by the engine 1 starts generating power, compared with the generated current, the current consumed by the electric heater 9 is predominantly large (the generated current is 60 to 90 A, the consumed current is 200 to 400 A). Accordingly, the battery 11 keeps discharging. When the heating after starting of the electric heater 9 is finished, the charging to the battery 11 is made possible.

Figure 7:
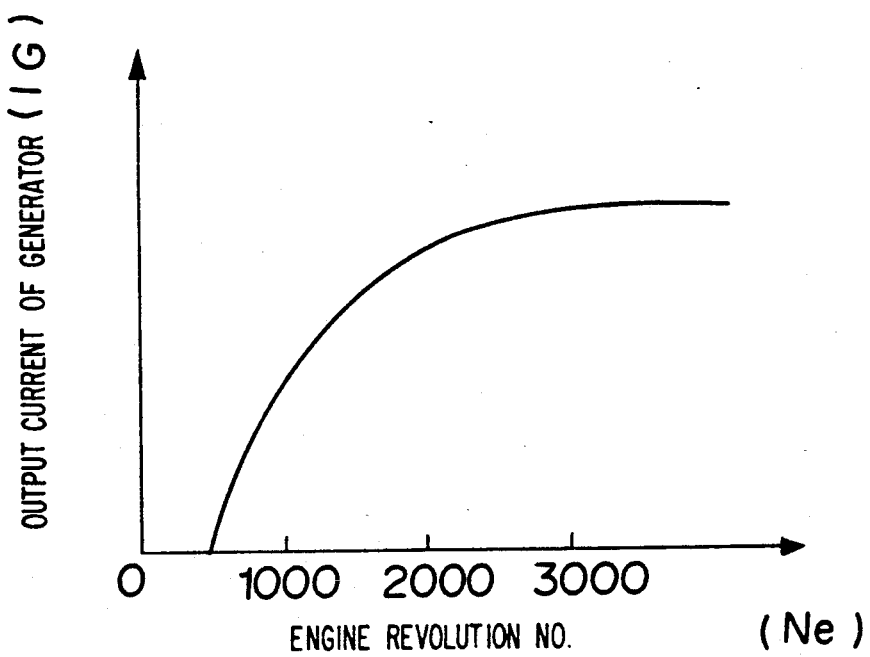
FIG. 7 is a characteristic diagram of an output of current of a generator according to the embodiment 1 of the present invention.

The revolution number of the engine varies in correspondence with a running state of a vehicle as shown in FIG. 6(b). The revolution number of the generator 10 which is mechanically coupled with the engine 1 by a belt, similarly varies. Since an output current of the generator 10 with respect to the revolution number thereof has a saturation characteristic as shown in FIG. 7, the charged current of the battery 11 is as shown in FIG. 6(c). The residual capacity of the battery 11 gradually recovers by the charged current as shown in FIG. 6(d). Naturally, when the output current of the generator 10 is consumed by an electric load such as a headlamp, the charged quantity to the battery 11 is reduced, and the recovery of the battery 11 is delayed.

As the current sensor 16 for detecting the charged and discharged current of the battery 11, one using a shunt resistance or one using a Hall element is reduced to practice. Since they belong to a well-known technology, a detailed explanation will be omitted.

Figure 8:
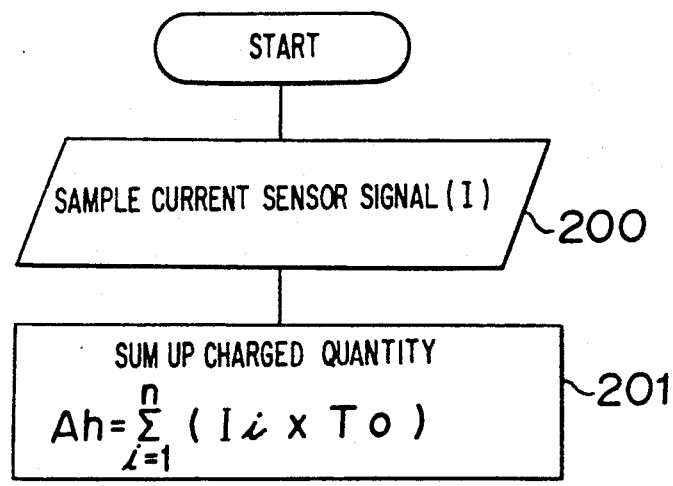
FIG. 8 is a flow chart showing operation of the embodiment 1 of the invented device.

Next, explanation will be given to the operation of the catalyst control unit 14a. Normally, the control switch 12 is turned on for a predetermined time since the key switch 13 has been turned on to the IG position, thereby flowing current to the electric heater 9. Receiving the output of the current sensor 16, the catalyst control unit 14a operates as shown in a flow chart of FIG. 8. First, in step 200, the operation samples an output signal I of the current sensor 16 at every predetermined time interval $T_O$ (for instance, 0.1 seconds). In step 201, the operation sums up the value at every sampling.

Figure 9:
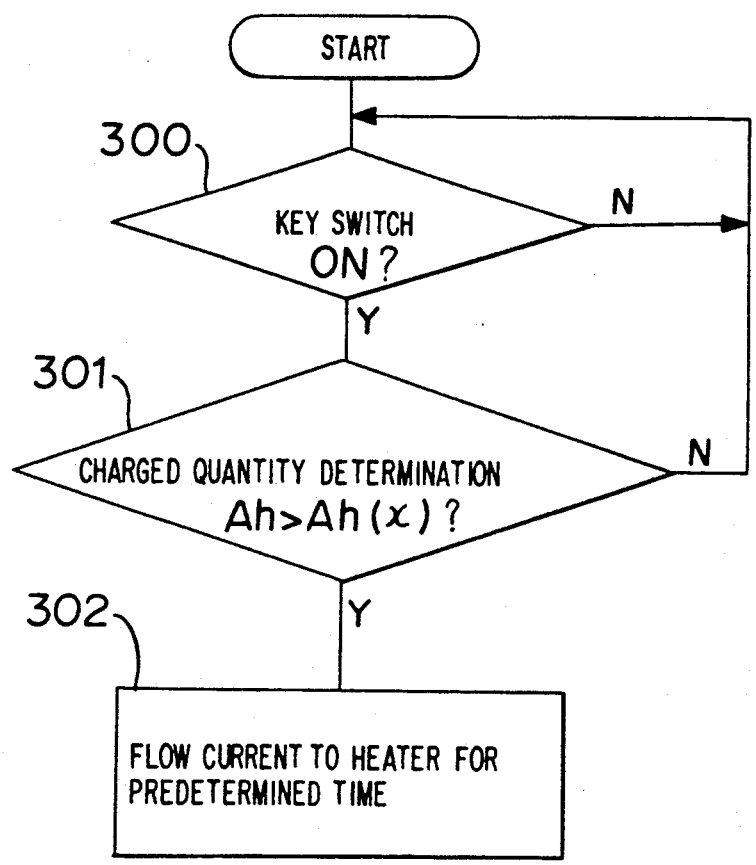
FIG. 9 is a flow chart showing operation of the embodiment of the invented device.

The current value I has a minus value when the battery 11 is discharged, and a plus value when the battery 11 is charged. In this way, the current value I is sampled since the current flowing to the electric heater 9 has been started until the operation of the engine 1 is stopped. A charged quantity Ah(c) is obtained by summing up the current value I multiplied by the sampling time $T_O$. This value is retained in a nonvolatile memory even after the engine stops. In the conventional device, current always flows to the electric heater after the engine stops and when the next starting is performed. In this embodiment, the device operates as shown in a flow chart of FIG. 9.

In step 300, the operation determines whether the key switch 13 is turned on. When the key switch 13 is turned on, in step 301, the operation determines whether the charged quantity Ah of the battery in the previous running is larger than a criteria Ah(x). When the charged quantity Ah of the battery is larger than the criteria Ah(x), the operation proceeds to step 302, and flows current to the electric heater for a predetermined time. When Ah <Ah(x), the operation prohibits at least the flowing current to the electric heater 9 before starting. As for the heating after starting, it is desirable to prohibit the flowing current thereafter in view of protection of the battery 11. However, this matter should be decided in relation to the purification of the exhaust gas.

As a rule, the criteria Ah(x) is preferable to have a value a little larger than 0. The reason is because the charging efficiency of the battery 11 is not 100%, and the battery has a charging loss. By using the criteria, repetition of the flowing current to the electric heater in a short interval, is prohibited thereby preventing to reduce the residual capacity of the batter 11.

Figure 10:
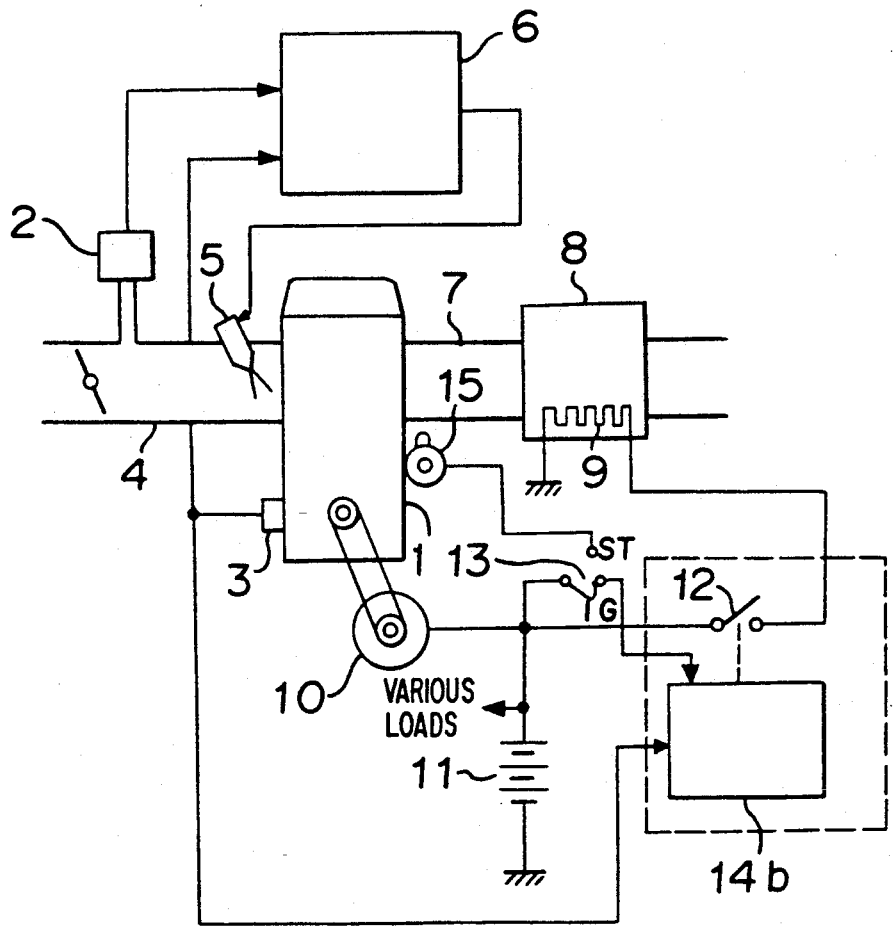
FIG. 10 is a construction diagram of an embodiment 2 of the invented device.

In the first embodiment, explanation has been given to the case wherein the charged quantity of the battery 11 is detected by the current sensor 16. A second embodiment will be explained according to FIGS. 10 and 11. FIG. 10 shows construction of the embodiment 2 of the invented device. A notation 14b designates a catalyst control unit. An output of the revolution number sensor 3 is inputted to the catalyst control unit 14b other than to the engine control unit 6. The other construction is the same as in FIG. 2.

Figure 11:
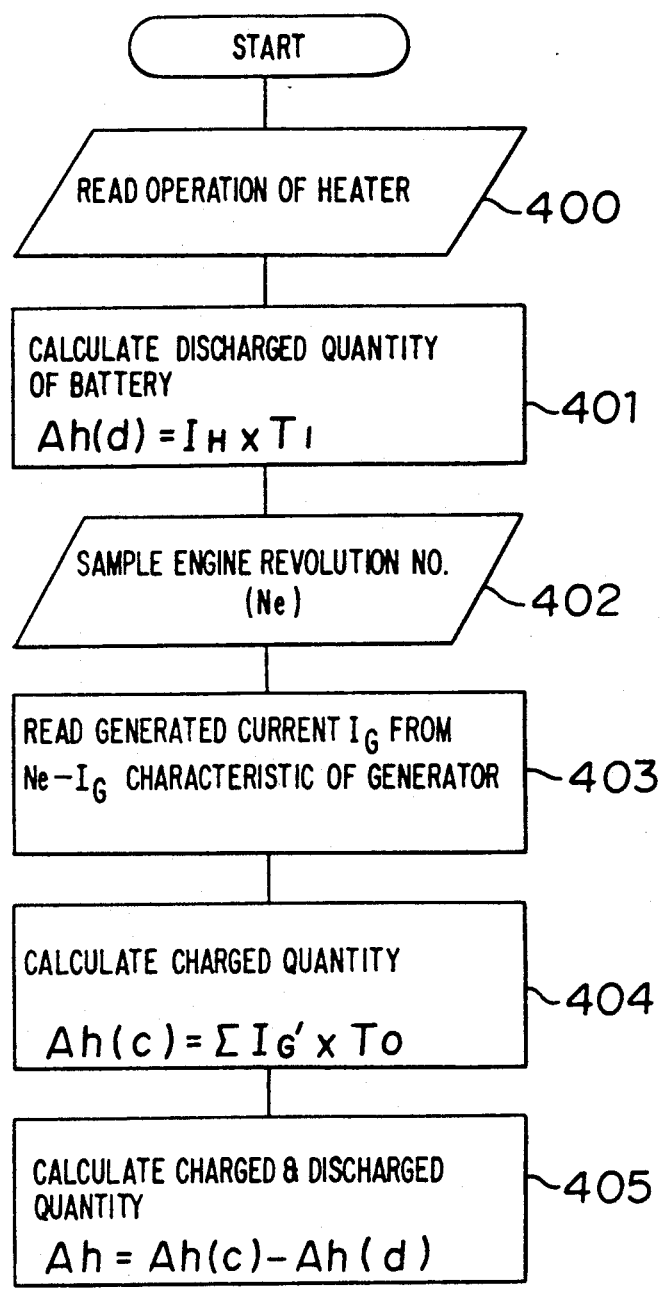
FIG. 11 is a flow chart showing operation of the embodiment 2 of the invented device.

Next, explanation will be given to the operation of the catalyst control unit 14 referring to a flow chart of FIG. 11. In step 400, the operation reads the operation of the electric heater 9. In step 401, the operation reads a value $I_H$ of a current to the electric heater which has previously been memorized in a memory of the catalyst control unit 14b. The operation multiplies the value $I_H$ by an operating time $T_1$ of the electric heater 9 thereby calculating a discharged quantity Ah(d) of the battery 11. In step 402, the operation samples a revolution number of the engine $N_e$ by an output of the revolution number sensor 3 at every predetermined interval $T_O$. In step 403, the operation reads a generated current $I_G$ from the $N_e-I_g$ characteristic of the generator 10 shown in FIG. 7. In step 404, the operation multiplies $I'_g$, the generated current $I_G$ subtracted by an average of various electric loads which are normally utilized such as in an ignition coil (for instance, $I_G \times 0.6$) by the sampling interval $T_O$, and obtains a presumed value of a charged quantity Ah(c) by summing up the products until the engine 1 stops. In step 405, the operation obtains a charged and discharged quantity Ah from a difference between the discharged quantity Ah(d) of the battery obtained in step 401 and the charged quantity Ah(c) obtained in step 404. This charged and discharged quantity Ah is memorized in a nonvolatile memory even after the key switch 13 is turned off. In starting up the engine 1 at the next time, current flows to the electric heater 9 only when the charged and discharged quantity Ah is equal to or more than a predetermined value Ah(x) as in the first example using the current sensor 16.

As stated above, according to the first and the second aspects of the present invention, in flowing current to the electric heater of the catalyst, a charged state of the battery is determined. When the charged electricity is insufficient, the flowing current to the electric heater is prohibited at least before the engine starts operating. Accordingly, the device can prevent the lowering of the capacity of the battery, the voltage applied from the battery to the starter is sufficiently procured, and the starting of the engine by the starter can smoothly be performed.

Figure 2:
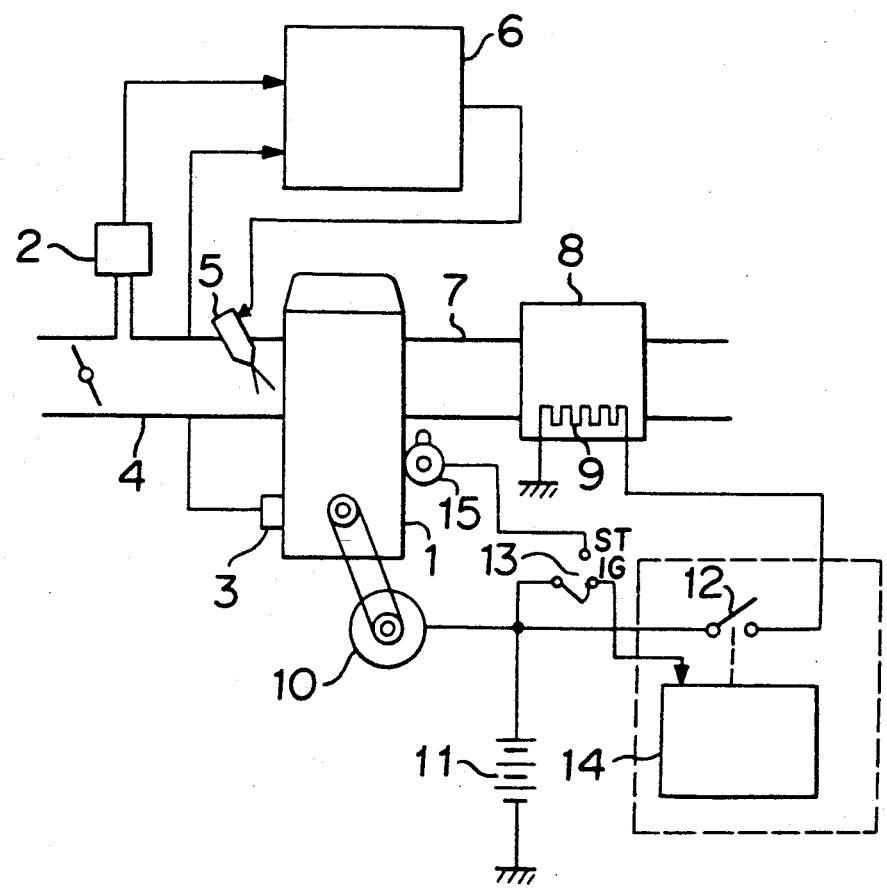
FIG. 2 is a construction diagram of the conventional device.
Figure 3:
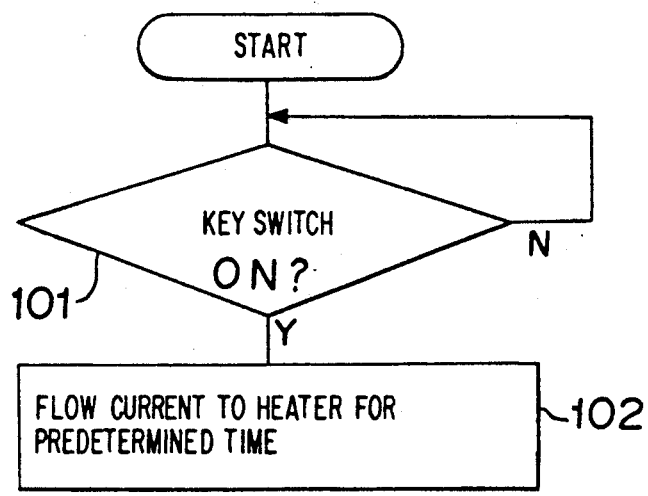
FIG. 3 is a flow chart showing operation of the conventional device.
Figure 4:
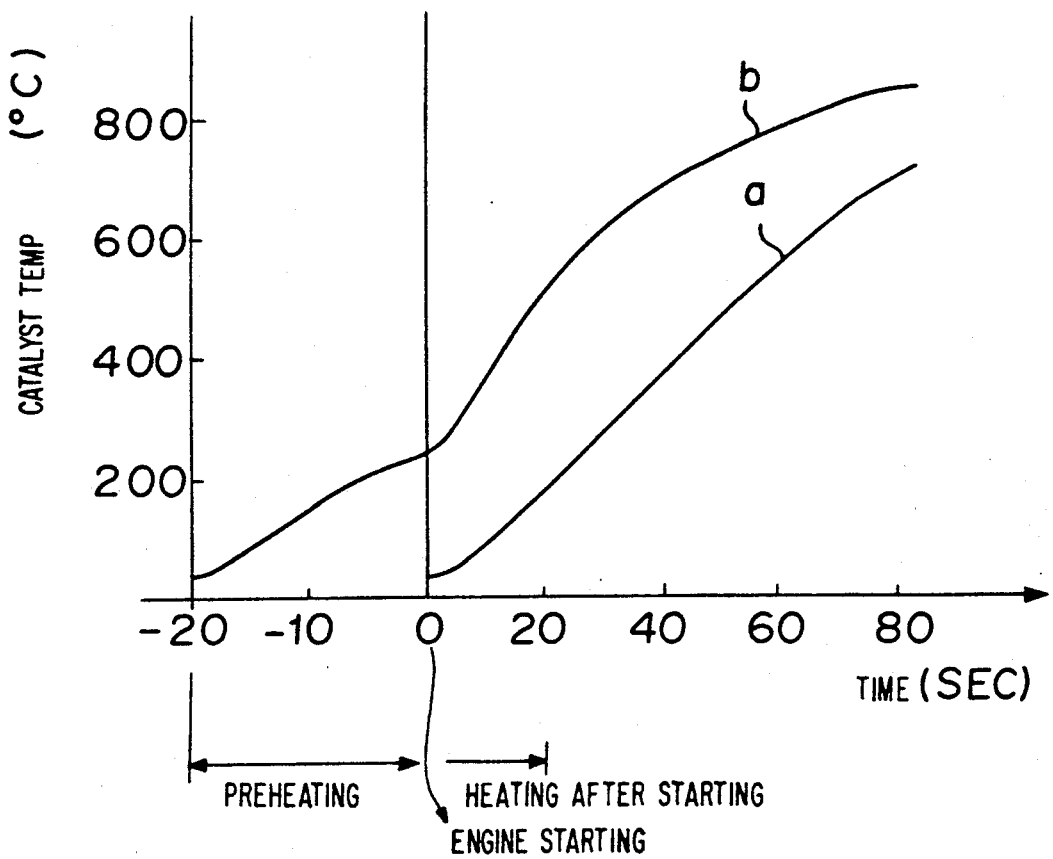
FIG. 4 is a diagram showing a relationship between time and temperature of a catalyst.
Figure 5:
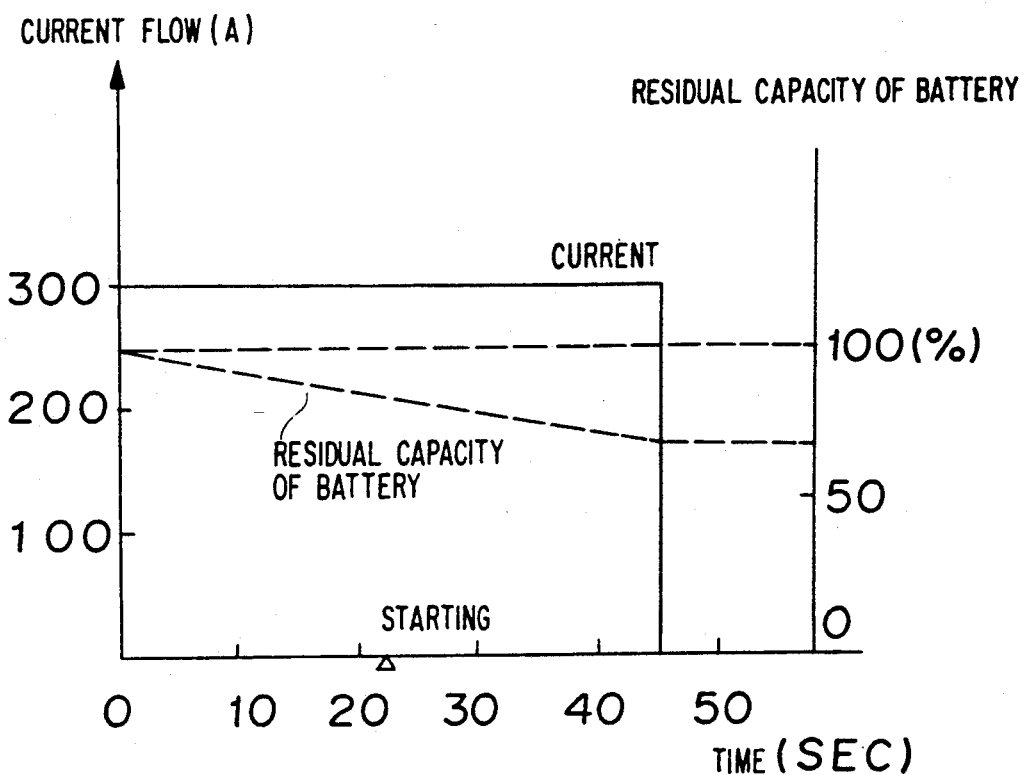
FIG. 5 is a characteristic diagram showing a residual capacity of a battery due to flowing currents to an electric heater.
Figure 12:
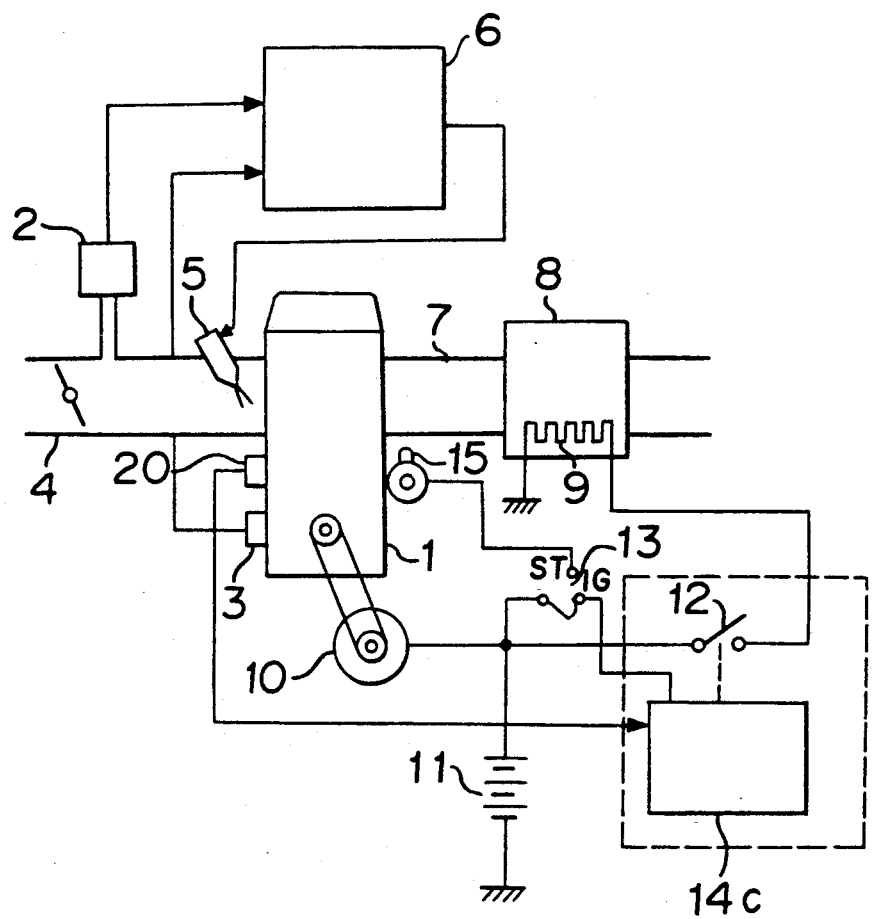
FIG. 12 is a construction diagram of an embodiment 3 of the invented device.
Figure 13:
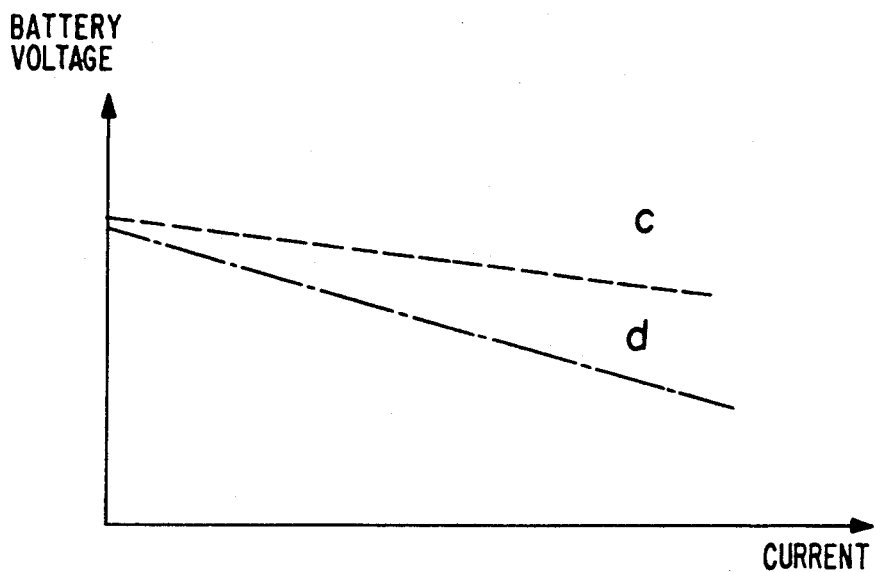
FIG. 13 is a diagram showing a current-voltage characteristic of a battery.

Next, explanation will be given to a third embodiment of the present invention referring to the drawings as follows. FIG. 12 shows construction of the third embodiment. The same portion as in FIG. 2 is attached with the same notation and the explanation is omitted. A notation 14c designates a catalyst control unit, and 20, a temperature sensor for detecting a temperature of the engine 1. The temperature sensor 20 is provided at a position capable of detecting a temperature of cooling water or engine oil.

Figure 15:
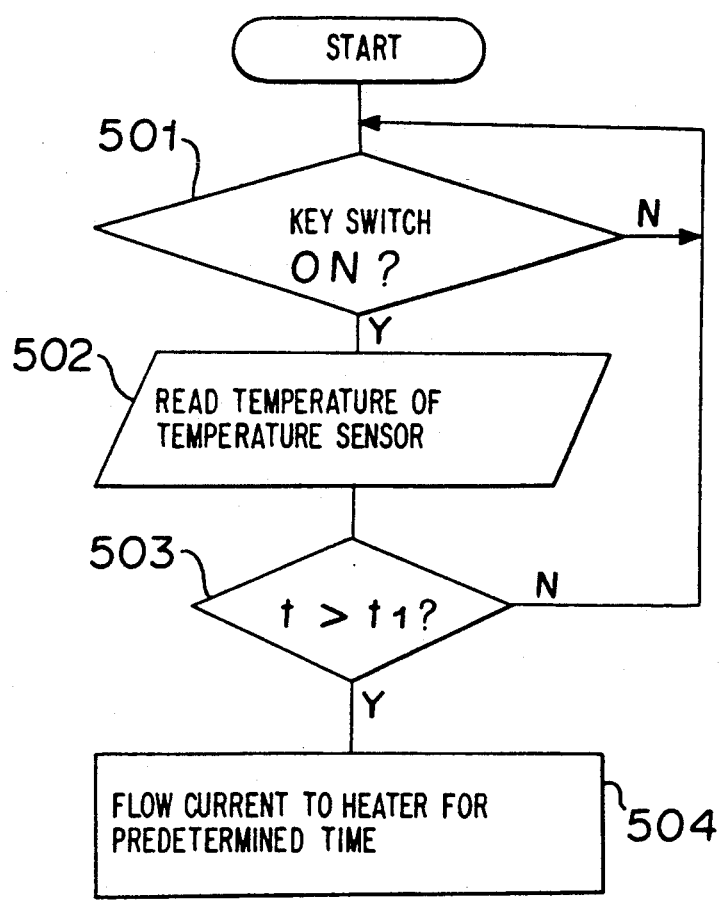
FIG. 15 is a flow chart showing operation of the embodiment 3 of the invented device.

Explanation will be given to the operation of the above construction referring to a flow chart of FIG. 15. In step 501, the operation determines whether the key switch 13 is turned on. When the key switch 13 is turned on, the operation proceeds to step 502, and reads an output of the temperature sensor 20. In step 503, the operation compares a temperature "t" obtained from the output of the temperature sensor 20 with a predetermined value "$t_1$". When $t > t_1$, the operation proceeds to step 504 and flows current to the electric heater 9 from the battery 11 for a predetermined time before starting the engine. When $t \leq t_1$, the operation returns to step 501 and does not flow current to the electric heater 9.

Figure 14:
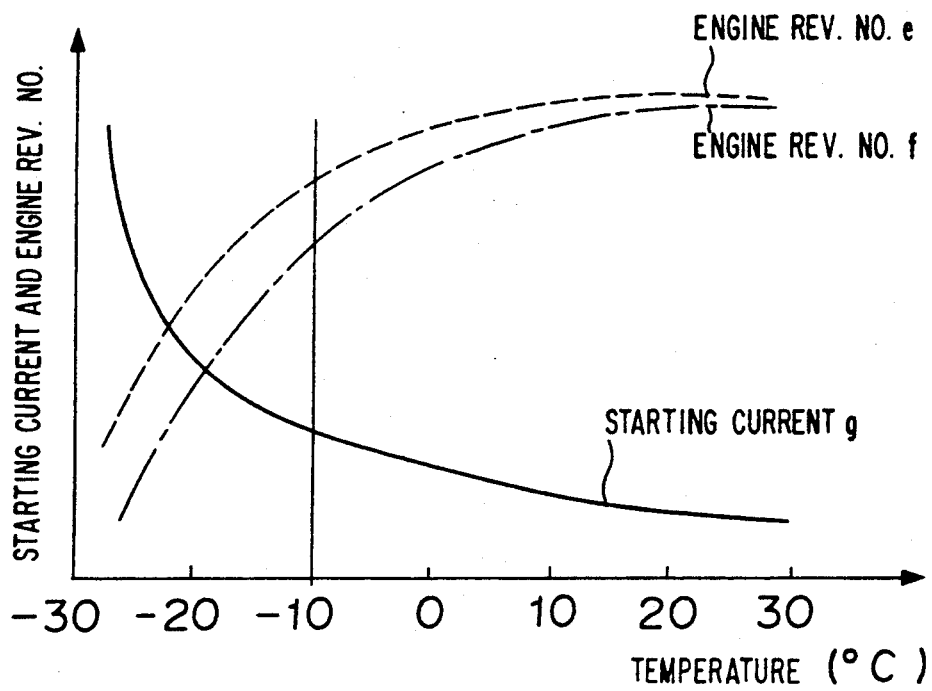
FIG. 14 is a diagram showing a relationship among a temperature of an engine, a revolution number of the engine and a starting current when the engine is started.

When the flowing current before starting is finished, driving (cranking) of the starter 15 by the battery 11 is performed. Naturally, the flowing current to the electric heater 9 after starting the engine is performed for a predetermined time. The predetermined value $t_1$ is determined in consideration of the temperature dependency of the viscosity of the engine oil, the capacity of the battery 11 and the temperature characteristic of the internal resistance of the battery. To obtain a good starting performance, $t_1$ is pertinently in a range of 0 to $-10°$ C. Accordingly, when the temperature of the engine is below the lowest value of the range, the flowing current to the electric heater before the engine is started (preheating) is prohibited. When $t_1$ is determined as $t_1 = -10°$ C., the flowing current to the electric heater 9 before the starting is prohibited when the temperature of the engine is equal to or less than $-10°$ C. Accordingly, as shown in curve "e" of FIG. 14, the revolution number of the engine in cranking is provided with a high value, and the engine 1 is excellently started.

As stated above, according to the third aspect of the present invention, the engine temperature is detected. When the engine temperature is equal to or less than the predetermined value, the flowing current to the electric heater before the engine starts operating, is prohibited. Accordingly, the lowering of the capacity of the battery before the starting of the engine can be prevented, and a comparatively high revolution number of the engine can be procured even when the engine is cold wherein the load torque of the starter is large, thereby preventing the in capacitance of starting.

What is claimed is:

1. A control device for a catalyst having an electric heater:
   provided at an exhaust pipe of an engine, having said catalyst for purifying exhaust gas and said electric heater for heating the catalyst before and after starting the engine comprising:

a battery charged by a generator driven by the engine for supplying power to the electric heater and for driving a starter;

a current sensor for detecting charged and discharged current of the battery;

summing means for summing a value of the charged and discharged current since a current to the electric heater has started flowing until the engine starts operating and until the engine stops operating; and means for comparing the summed value with a predetermined value and for prohibiting the current flowing to the electric heater during a period at least before the engine starts operating when the summed value is equal to or less than the predetermined value.

2. A control device for a catalyst having an electric heater:
   provided at an exhaust pipe of an engine, having said catalyst for purifying exhaust gas and said electric heater for heating the catalyst before and after starting the engine comprising:

a battery charged by a generator driven by the engine for supplying power to the electric heater and for driving a starter;

means for calculating a discharged quantity of the battery by multiplying a first value of a predetermined current flowing to the electric heater by a time of flowing current to the electric heater;

engine revolution number detecting means for detecting a revolution number of the engine;

means for calculating a generated current of a generator based on the revolution number of the engine;

means for calculating a charged quantity of the battery by summing a second value of the generated current; and means for prohibiting the current flowing to the electric heater during a period at least before the engine starts operating when a third value of the charged quantity subtracted by the discharged quantity is below a predetermined value.

3. A control device for a catalyst having an electric heater provided at an exhaust pipe of an engine, having said catalyst for purifying exhaust gas and said electric heater for heating the catalyst before and after starting the engine comprising:

a battery charged by a generator driven by the engine for supplying power to the electric heater and for driving a starter;

a temperature sensor for detecting a temperature of the engine; and means for comparing the temperature of the engine with a predetermined value and prohibiting a current flowing to the electric heater before the engine starts operating when the temperature of the engine is equal to or less than the predetermined value.

* * * * *